(12) United States Patent
Uchida

(10) Patent No.: US 8,290,220 B2
(45) Date of Patent: Oct. 16, 2012

(54) FACE AUTHENTICATING APPARATUS, FACE AUTHENTICATING METHOD, AND PROGRAM

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 1111 days.

(21) Appl. No.: 12/278,119

(22) PCT Filed: Feb. 21, 2007

(86) PCT No.: PCT/JP2007/053212
§ 371 (c)(1),
(2), (4) Date: Aug. 1, 2008

(87) PCT Pub. No.: WO2007/099834
PCT Pub. Date: Sep. 7, 2007

(65) Prior Publication Data
US 2009/0092294 A1    Apr. 9, 2009

(30) Foreign Application Priority Data

Mar. 1, 2006  (JP) .................................. 2006-055148

(51) Int. Cl.
G06K 9/00    (2006.01)
(52) U.S. Cl. ......................................................... 382/118
(58) Field of Classification Search ................... 382/118
See application file for complete search history.

(56) References Cited

U.S. PATENT DOCUMENTS

| 6,873,713 B2 * | 3/2005 | Okazaki et al. ............... 382/118 |
| 6,922,478 B1 | 7/2005 | Konen et al. |
| 7,006,672 B2 * | 2/2006 | Sato et al. ..................... 382/118 |
| 7,120,278 B2 * | 10/2006 | Sukegawa et al. ............. 382/118 |
| 7,130,454 B1 * | 10/2006 | Berube et al. ................. 382/118 |
| 7,308,120 B2 * | 12/2007 | Sato et al. ..................... 382/118 |
| 7,366,329 B2 * | 4/2008 | Ono ............................ 382/116 |
| 7,412,081 B2 * | 8/2008 | Doi .............................. 382/118 |
| 7,454,041 B2 * | 11/2008 | Sukegawa et al. ............. 382/118 |
| 8,170,295 B2 * | 5/2012 | Fujii et al. ..................... 382/117 |
| 2005/0125360 A1 * | 6/2005 | Tidwell et al. ................. 705/65 |
| 2006/0126906 A1 * | 6/2006 | Sato et al. ..................... 382/118 |
| 2006/0206724 A1 * | 9/2006 | Schaufele et al. ............. 713/186 |

FOREIGN PATENT DOCUMENTS

| CA | 2214190 A1 | 4/1999 |
| FR | 2861482 A1 | 4/2005 |
| JP | 4-195278 A | 7/1992 |
| JP | 07141506 A | 6/1995 |
| JP | 7-509583 A | 10/1995 |
| JP | 10-312462 A | 11/1998 |
| JP | 2001256496 A | 9/2001 |
| JP | 2002251604 A | 9/2002 |

(Continued)

OTHER PUBLICATIONS

Supplementary European Search Report for EP 07 71 4712 dated Nov. 17, 2010.

(Continued)

*Primary Examiner* — Jingge Wu
*Assistant Examiner* — Utpal Shah

(57) ABSTRACT

The present invention provides a technique for preventing an unauthorized user from using a terminal and ensuring secure use of the terminal.

A presentation pattern display unit 5 that is provided at a different position from a key input unit displays an instruction for a user to input a key pattern during face authentication, and a built-in camera 1 captures a face of the user and/or a movement of a portion of the face of the user during a portion of or the entire time from when the presentation pattern display unit 5 displays the instruction to when the key input through the key input unit 10 is completed, so that it is determined whether the captured face image is of a living body.

17 Claims, 3 Drawing Sheets

FOREIGN PATENT DOCUMENTS

| | | | |
|---|---|---|---|
| JP | 2002251614 | A | 9/2002 |
| JP | 2003099763 | A | 4/2003 |
| JP | 2003317100 | A | 11/2003 |
| JP | 2004259255 | A | 9/2004 |
| JP | 2005-135271 | A | 5/2005 |
| JP | 2005259049 | A | 9/2005 |
| JP | 2008276345 | A * | 11/2008 |
| WO | 2004114231 | A1 | 12/2004 |

OTHER PUBLICATIONS

K. Kollreider et al., "Evaluating Liveness by Face Images and the Structure Tensor", Automatic Identification Advanced Technologies, 2005, XP10856500.

R. W. Frischholz et al., "Avoiding Replay-Attacks in a Face Recognition System using Head-Pose Estimation", Analysis and Modeling of Faces and Gestures, AMFG'03, 2003.

W. Zhao et al., "Face Recognition: A Literature Survey", ACM Computing Surveys, vol. 35, No. 4, Dec. 2003, pp. 399-459.

Japanese Office Action for JP2008-502725 issued Nov. 2, 2010.

Japanese Office Action for JP2008-502725 issued Jan. 25, 2011.

Matthew Turk et al., "Eigenfaces for Recognition", Journal of Cognitive Neuroscience, vol. 3, No. 1, Massachusetts Institute of Technology © 1991, pp. 71-86.

International Search Report for PCT/JP2007/053212 mailed Mar. 27, 2007.

* cited by examiner

F I G. 3
(a) PRESENTATION PATTERN DISPLAY UNIT
(b) PIN INPUT UNIT
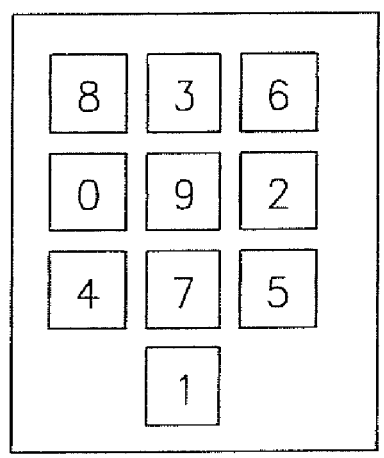
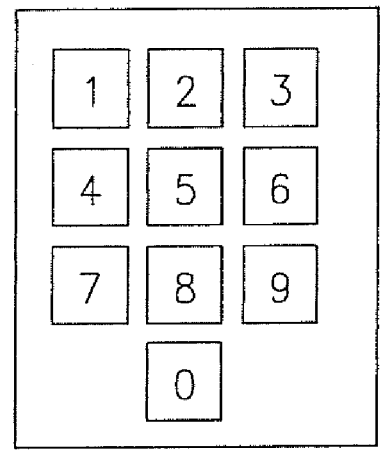

FACE AUTHENTICATING APPARATUS, FACE AUTHENTICATING METHOD, AND PROGRAM

TECHNICAL FIELD

The present invention relates to a face authentication technique for identifying a user using personal information equipment, such as a mobile phone.

BACKGROUND ART

In the related art, it is necessary to identify a user in order to permit the user to use some or all of functions of personal information terminal equipment (hereinafter, referred to as a 'terminal') such as a mobile phone.

In many cases, the following method has been used frequently: an input character string pattern called a code number or a password, which is secret information of an authorized user, is determined beforehand; and only when the determined character string pattern is input, the user will be authenticated.

However, in the user authentication using such secret information, when the terminal falls into another's hands, another person can find a correct PIN by guessing the PIN from the birthday of the authorized user, stealing a glance at the input of the password by the authorized user, or randomly inputting the various PIN, and then input the found string pattern to use the terminal. Therefore, as more secure and convenient authenticating method, user authentication using the user's biometrics has been used.

In an example of authentication method using biometric features, such as a face of an authenticated user, a face pattern of an authorized user is captured by a camera of a terminal beforehand, and then registered in the terminal. At user authentication, the face of the user who attempts to use the terminal is captured by the camera. When similarity between the captured face image and the registered face image is sufficiently high, the user is determined as an authorized user, and the user authentication succeeds.

As an authentication method by matching between face images, a so-called EigenFace method (refer to Non-patent Document 1) has been known. In the EigenFace method disclosed in Non-patent Document 1, the size of each image in a set of images is normalized, and a partial space of a feature vector composed of gray values of pixels in each image is generated by a principal component analysis. In addition, the feature vectors of an input image and of a registered image are projected onto a partial space to calculate a matching score. Then, user authentication is performed on the basis of the calculated matching score.

In the above mentioned method, an appropriate face matching method is used to sufficiently suppress a risk of pretending in user authentication, and can solve the problem of the password method that has been generally used in the related art, that is, the problem that an unauthorized user can find the password by guess or stealthy glance.

Non-patent Document 1: M. Turk, A. Pentland, "Eigenfaces for recognition", Journal of Cognitive Neuroscience, Vol. 3, No. 1, pp. 71-86, 1991.

DISCLOSURE OF THE INVENTION

Problem to Be Solved by the Invention

However, the above-mentioned related art has the problem of identity theft using a photograph.

That is, there is a risk that an unauthorized user will pass through user authentication by presenting a photograph of an authorized user to the camera. In this case, it is difficult to determine and prevent the risk.

As another example of the elaborate identity theft, a moving picture including a variation in the face of an authorized user over time, which is captured by a video camera, is displayed on a small television screen or a display unit of an information equipment, and the screen or the image is presented to the camera for user authentication. In this case, it is more difficult to determine and prevent the injustice.

Japanese Patent Application Laid-Open Publication No. 2005-259049 discloses a technique for preventing the identity theft. However, this technique requires a radiant heat sensor, which results in an increase in manufacturing costs.

The present invention has been made in order to solve the above problems, and an exemplary object of the invention is to provide a technique for preventing an unauthorized user from passing through user authentication and ensuring secure use of a user terminal by presenting the photograph of the face of an authorized user to a camera at low cost and with only a general camera.

Means for Solving the Problem

In order to achieve the exemplary object, according to an exemplary of the invention, a face authenticating apparatus includes: allowing a presentation pattern display unit that is provided at a different position from a key input unit to display an instruction for a user to input a key pattern during face authentication; allowing an image capturing unit to capture a face of a user and/or a movement of a portion of the face of the user during a portion of or the entire time from when the presentation pattern display unit displays the instruction to when the key input is completed; and determining whether the captured face image is of a living body.

According to another exemplary aspect of the invention, a face authenticating method includes: allowing a presentation pattern display unit that is provided at a different position from a key input unit to display an instruction for a user to input a key pattern during face authentication; allowing an image capturing unit to capture a face of a user and/or a movement of a portion of the face of the user during a portion of or the entire time from when the presentation pattern display unit displays the instruction to when the key input is completed; and determining whether the captured face image is of a living body.

Effect of the Invention

According to the above-mentioned exemplary aspects of the invention, it is possible to prevent an unauthorized user from passing through user authentication and to ensure secure use of a user terminal by presenting the photograph of the face of an authorized user to a camera.

EXEMPLARY EMBODIMENTS FOR CARRYING OUT THE INVENTION

Hereinafter, a first exemplary embodiment of the invention will be described in detail with reference to the accompanying drawings.

Referring to FIG. 1, a face authenticating apparatus according to the exemplary embodiment is implemented as a user terminal, and includes a built-in camera 1, an image capture instructing unit 2, an image processing unit 3, a presentation pattern generating unit 4, a presentation pattern display unit 5, a face authenticating unit 6, a difference determining unit 7, an authentication result processing unit 8, a PIN determining unit 9, a key input unit 10, a registered face image storage unit 11, and a password storage unit 12.

The presentation pattern display unit 5 and the built-in camera 1 are provided at an upper part of the user terminal (in many cases, an upper half of the user terminal that is set to the ear, which is also called an R side), and the key input unit 10 (keypad) is provided at a lower part of the user terminal (in many cases, a lower half of the user terminal that is set to the mouth, which is also called an M side).

In order to get permission to use the user terminal, the user inputs a pattern, such as a PIN, using the key input unit 10, according to an instruction displayed on the presentation pattern display unit 5, with his/her face facing the built-in camera 1 that is provided in the user terminal.

FIG. 1 shows an example of a keypad including 10 number keys, but the invention is not limited thereto. For example, a keyboard capable of inputting the alphabet may be used to input a password including the alphabet.

For an input pattern, the presentation pattern generating unit 4 determines an instruction to generate the input pattern, and the presentation pattern display unit 5 displays the instruction. The image capture instructing unit 2 controls the built-in camera 1 to capture a moving picture of the user's face in the view during the time from when the instruction is displayed on the presentation pattern display unit 5 to when the user completes the input of information to the key input unit 10, and then the image processing unit 3 processes the captured image. In this process, the moving picture is divided into a plurality of frames captured in the temporal direction, and a portion of or the entire frame image group is used for face authentication and the biometric verification of the face.

First, in a face authentication process of the face authenticating unit 6, one frame image or a plurality of image groups suitable for face authentication is selected from a plurality of frame images, and the selected frame image is compared with the registered frame image that has been previously registered in the registered face image storage unit 11.

When the similarity between the captured face image and the registered face image is higher than a threshold value, the face authentication succeeds, and the result is notified to the authentication result processing unit 8.

In a biometric verification process of the difference determining unit 7, a plurality of frame images captured in the temporal direction are compared to each other, and a difference therebetween is evaluated to determine whether the face of a living body is captured, or a photograph or a planar moving picture is captured.

The PIN determining unit 9 compares the PIN that is input through the key input unit by the user with an input pattern that is expected to be correct, which is obtained from the instruction generated by the presentation pattern generating unit 4 and a PIN read from the password storage unit 12. When the PINs are identical to each other, face authentication by the face authenticating unit succeeds, and the difference determining unit determines that the face of a living body is captured, the authentication result processing unit unlocks the user terminal to allow the use of the terminal.

Meanwhile, if not, the presentation pattern generating unit 4 generates a new instruction, and the presentation pattern display unit 5 displays the generated instruction to the user to request the user to input a pattern using the key input unit 10.

Next, the processing operation of the exemplary embodiment will be described in detail with reference to the drawings.

First, in a PIN registering process that is performed when a user starts to use the user terminal, a correct PIN that is input through the key input unit 10 by an authorized user is stored in the password storage unit 12. In the following description, it is assumed that the PIN is '6543'. In general, the user terminal is locked in order to prevent an unauthorized user from using the user terminal, and the user terminal is in a disabled state. Next, the flow of a user authentication process for performing user authentication in order to get permission to use the terminal which is locked will be described with reference to FIG. 2.

When user authentication is needed, first, a terminal user authentication process is performed in response to a terminal user authentication request from the user (for example, the user pushes any one of the keys of the key input unit) (S201).

In the user authentication process, first, the presentation pattern generating unit 4 generates a presentation pattern, such as '84+PIN+382' (S202). In this case, 84 or 382 is a random digit string that is generated whenever the user authentication is performed.

A character string such as 'Please input 84 followed by PIN, and then input 382' is displayed on the presentation pattern display unit 5, according to the generated pattern, and the image capture instructing unit 2 operates the built-in camera 1 (S203).

Typically, the user views a first half of the instruction, that is, 'Please input 84 followed by PIN', that is displayed on the presentation pattern display unit 5 provided at the upper part of the terminal, and uses the key input unit 10 provided at the lower part of the terminal to input '846543'. Then, the user views a latter half of the instruction, that is, 'and then input 382', that is displayed on the presentation pattern display unit provided at the upper part of the terminal, and uses the key input unit 10 provided at the lower part of the terminal to input '382' (S204 to S207). As such, when the user alternately views the upper part and the lower part of the terminal, it is expected that the eyes or the face of the user will move in the vertical direction. The built-in camera 1 captures the movement of the eyes or the face as a moving picture or continuous images.

When the input is completed, the capturing operation of the built-in camera 1 stops (S208).

When the input is completed, the PIN determining unit determines whether the pattern input from the key input unit is correct or not (S209). Specifically, the PIN determining unit determines whether the pattern input from the key input unit is correct on the basis of the correct PIN stored in the password storage unit 12 (in this case, '6543') and the rule of the pattern generated by the presentation pattern generating unit 5, and transmits the determination result to the authentication result processing unit 8.

Meanwhile, the image processing unit 3 processes the frame images that are captured in the temporal direction by the built-in camera 1, and these frame images are used for face authentication and the biometric verification of the face. First, in the face authentication process, the face authenticating unit 3 selects one frame image or a plurality of image groups suitable for face authentication, such as a full face facing forward, and compares the selected images with the registered face images that have been previously registered in the registered face image storage unit 11 (S210). When the similarity between the captured face image and the registered face image is higher than a threshold value, the face authentication succeeds, and the result is notified to the authentication result processing unit 8.

The difference determining unit 7 performs a position adjustment process for compensating for the relative movement between the camera and the face on a plurality of frames of face images, cuts out a face image portion from the frame, and determines the similarity between the plurality of frames with regard to the center of the face image including the eyes, the nose, and the mouth (S211). If a cumulative value of similarity scores including detailed portions of the images between the frames, particularly, the positions of the eyeball of the eye is larger than a threshold value, it is determined that a still picture, such as a photograph, is presented. On the other hand, if the cumulative value of the similarity scores is smaller than the threshold value and it is determined that the detailed portions including, for example, the positions of the eyeball after the position adjustment process and the cut-out process are significantly different from each other, the difference determining unit 7 determines that the face of a living body is captured by the camera.

In the process of determining the face of a living body, the following method may be used: the positional relationship between a plurality of feature points in each frame that are defined by a plurality of organs, such as the outer corners and the inner corners of both eyes, the top and both sides of the nose, both ends of the mouth, and the center of the lip, is calculated, thereby calculating correlation between these feature points of the frames. When the positional relationship between the feature points in many frames has high correlation, the organs are not relatively moved, and thus it is possible to determine that a photograph is presented.

The determination result of the difference determining unit 7 is transmitted to the authentication result processing unit 8. When the PIN determining unit determines that the PINs are identical to each other, the face authentication by the face authenticating unit succeeds, and the difference determining unit determines that the face of a living body is captured, the user who inputs the PIN is determined as an living authorized user, and the authentication result processing unit 8 unlocks the terminal such that the use of the terminal is permitted (S212 and S213).

If not, it is determined that the user who inputs the PIN is an unauthorized user, and the terminal is not unlocked.

According to this exemplary embodiment, when a camera is provided in the terminal, new hardware or complicated software is not needed. Therefore, it is possible to reduce development costs, as compared to a structure in which a sensor or special software for preventing identity theft is used. As a result, it is possible to reduce manufacturing costs.

Next, a second exemplary embodiment of the invention will be described in detail. In the first exemplary embodiment, the instruction 'Please input 84 followed by PIN, and then input 382' is displayed on the presentation pattern display unit 5 at once. In this case, there is a fear that the user remembers the instruction at once and may not alternately view the upper and lower parts of the terminal. Therefore, in this exemplary embodiment, first, an instruction 'Please input 84' is displayed in operative association with the detected input timing to the key input unit 10, and after the input of 84 is confirmed, an instruction 'Please input PIN' is displayed. After the input of the PIN is confirmed, an instruction 'Please input 382' is displayed. In this way, it is possible to make the user alternately view the upper and lower parts of the terminal by dividing the instruction.

Next, a third exemplary embodiment of the invention will be described in detail. As an example of obtaining the same effects as those in the second exemplary embodiment, the presentation pattern display unit 5 displays a keypad having random numbers arranged thereon shown in (a) of FIG. 3 to allow the user to push keys corresponding to a PIN using the key input unit 10. For example, when a PIN is '6543' and the number arrangement shown in (a) of FIG. 3 is displayed, the user sequentially pushes keys 3, 9, 7, and 2 of the key input unit corresponding to numbers 6, 5, 4, and 3 of the keypad shown in (a) of FIG. 3. In this way, it is possible to make the user alternately view the upper and lower parts of the terminal.

As described above, while the user alternately views the presentation pattern display unit 5 and the key input unit 10, the presentation pattern display unit 5 may display an instruction 'Please see built-in camera' to allow the user to face the built-in camera 1. In this way, it is possible to stably capture a full face image suitable for face authentication, and make the face of the user move in the vertical direction. As a result, it is possible to improve accuracy in determining the face of a living body.

In the above-described exemplary embodiments, the input of a PIN, which is secret information, is needed. However, if it is considered that face authentication has sufficient accuracy, the process of inputting the PIN and the process of identifying the PIN are not needed. In this case, for example, when a certain key is pushed to require user face authentication, the built-in camera 1 is operated. During image capture, for example, the presentation pattern display unit 5 displays an instruction 'Please push key 3', and the user views the instruction and pushes key 3 on the key input unit 10. In this way, it is possible to determine the face of a living body on the basis of the movement of the face or the eyeball in the vertical direction. As a result, it is possible to simply obtain the same effects as those in the above-described exemplary embodiments.

Further, when performing a key input while viewing the presentation pattern display unit 5, some users may move only their eyeballs without moving their faces. In this case, the following method may be used: the difference determining unit 7 detects the position of the eyes from a face image, and determines whether the face of a living body is captured on the basis of the difference in the movement of the eyeballs of the eyes between the face image frames.

Further to determining whether all the images are uniformly moved by comparing the time-series frames, a determination logic may be used which determines whether a key input is performed using the key input unit 10 after a rational time has elapsed after the presentation pattern display unit 5 displays a predetermined instruction. In this way, it is possible to determine whether a photograph is used for user authentication, and it is also possible to determine whether the moving picture of an authorized user, which has been previously captured by a video camera, is used for user authentication (when the moving picture has been previously captured, it is difficult to synchronize the display of an instruction on the presentation pattern display unit 5 with a key input with a rational time delay therebetween).

In the above-described exemplary embodiments, the built-in camera 1 is provided at the upper part of the user terminal, and the key input unit 10 is provided at the lower part of the user terminal. However, the positional relationship in which the built-in camera 1 is provided at the upper part and the key input unit 10 is provided at the lower part is just an example. Any positional relationship including an adjacent positional relationship may be established therebetween.

Although the exemplary embodiments of the invention have been described above, the invention is not limited thereto, but various modifications and changes of the invention can be made without departing from the scope and spirit of the invention. For example, an apparatus may read and execute a program for implementing the functions of the user terminals according to the above-described exemplary embodiments to perform the functions. The program may be transmitted to another computer system through a computer readable recording medium, such as a CD-ROM or a magneto-optical disk, or by carrier waves through the Internet or a telephone line, which is a transmission medium.

In the above-described exemplary embodiments, the system structure in which each function of the user terminal is implemented by one computer system is used, but the invention is not limited thereto. Each function of the user terminal may be implemented by a plurality of apparatuses.

The invention can be generally applied to a mobile phone or portable information communication equipment including a camera function.

BRIEF DESCRIPTION OF THE DRAWINGS

FIG. 3 is a diagram illustrating a display example according to a third exemplary embodiment of the invention.

REFERENCE NUMERALS

Figure 1:
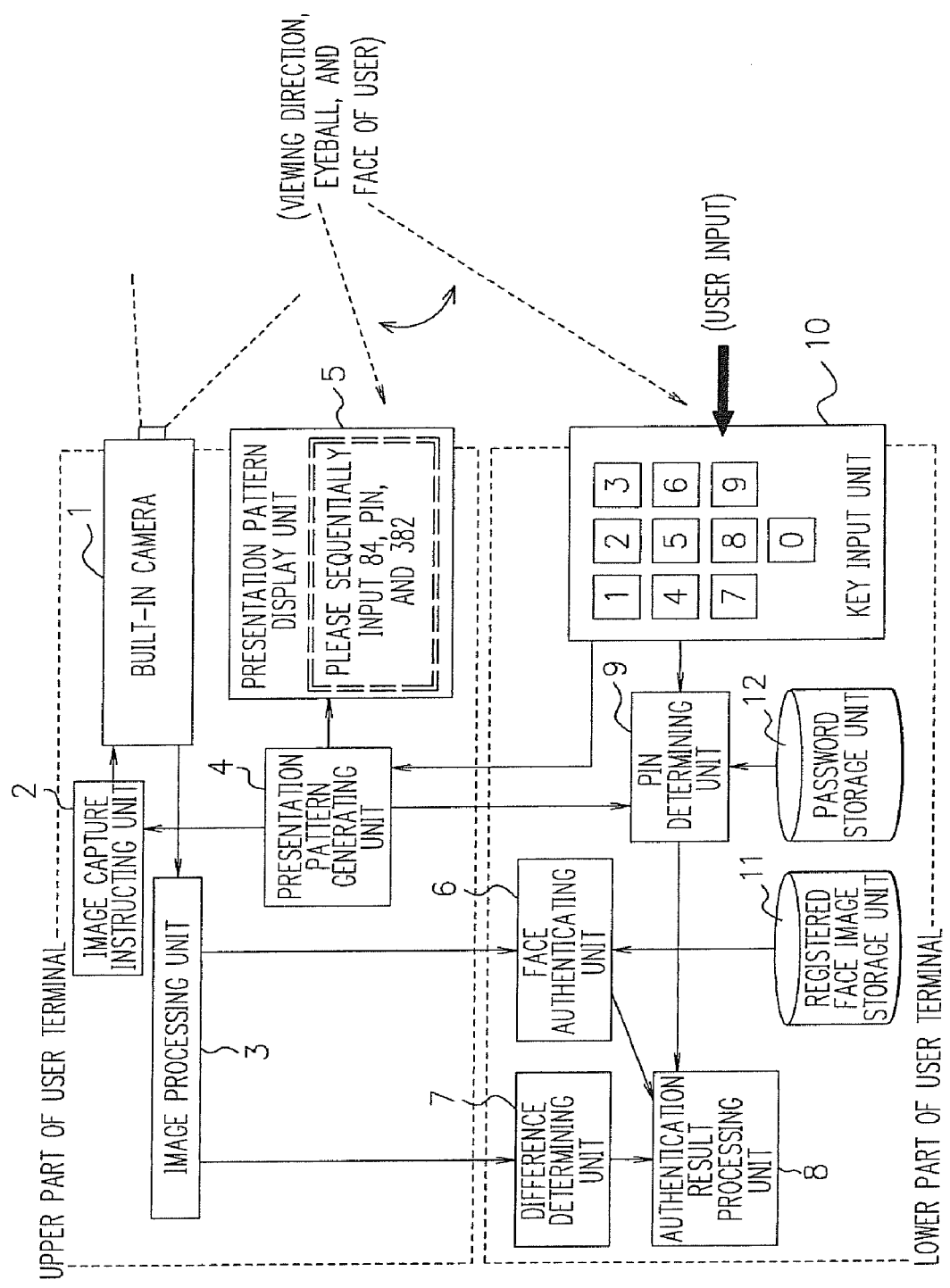
FIG. 1 is a diagram illustrating a structure of a face authenticating apparatus according to a first exemplary embodiment of the invention.
Figure 2:
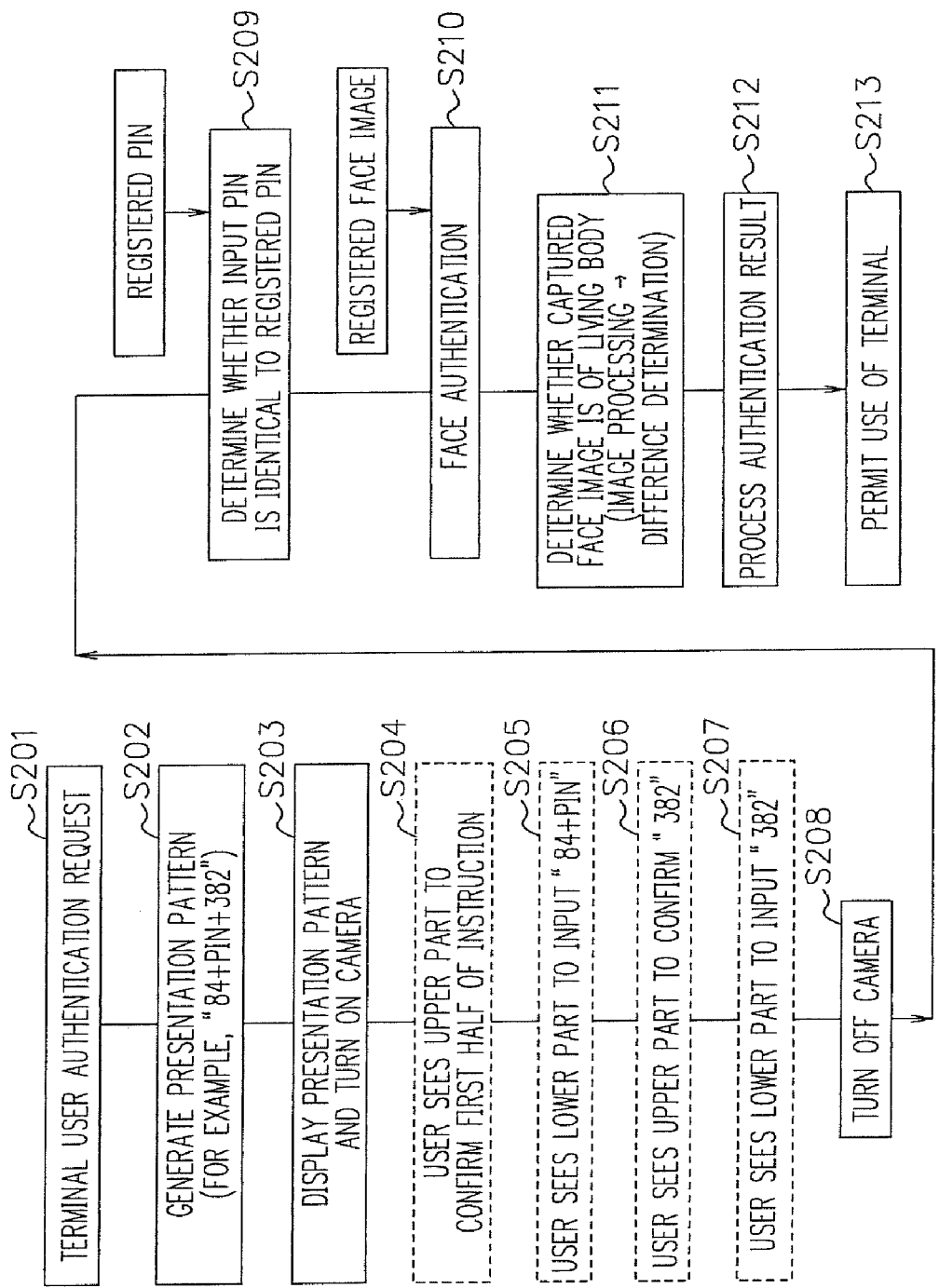
FIG. 2 is a flowchart illustrating a processing operation of the first exemplary embodiment of the invention.

1: BUILT-IN CAMERA
2: IMAGE CAPTURE INSTRUCTING UNIT
3: IMAGE PROCESSING UNIT
4: PRESENTATION PATTERN GENERATING UNIT
5: PRESENTATION PATTERN DISPLAY UNIT
6: FACE AUTHENTICATING UNIT
7: DIFFERENCE DETERMINING UNIT
8: AUTHENTICATION RESULT PROCESSING UNIT
9: PIN DETERMINING UNIT
10: KEY INPUT UNIT
11: REGISTERED FACE IMAGE STORAGE UNIT
12: PASSWORD STORAGE UNIT

The invention claimed is:

1. A face authenticating apparatus comprising:
allowing a presentation pattern display unit that is provided at a different position from a key input unit to display an instruction for a user to input a key pattern during face authentication;
allowing an image capturing unit to capture a face of a user and/or a movement of a portion of the face of the user during a portion of or the entire time from when the presentation pattern display unit displays the instruction to when the key input is completed; and
determining whether the captured face image is of a living body,
wherein the presentation pattern display unit displays an instruction to see the image capturing unit while the user alternately views the presentation pattern display unit and the key input unit.

2. The face authenticating apparatus according to claim 1, wherein the presentation pattern display unit is separated from the key input unit in the vertical direction.

3. The face authenticating apparatus according to claim 1, wherein the presentation pattern display unit displays a portion of the instruction, detects an input timing to the key input unit, and displays the other portion of the instruction after the input is confirmed.

4. The face authenticating apparatus according to claim 1, wherein the presentation pattern display unit displays a keypad including random numbers arranged thereon to allow the user to input keys corresponding to the arrangement using the key input unit.

5. The face authenticating apparatus according to claim 1, wherein the face authenticating apparatus determines whether, after a rational time has elapsed after the presentation pattern display unit displays a predetermined instruction, a key input corresponding to the instruction is performed on the key input unit.

6. A face authenticating method comprising:
allowing a presentation pattern display unit that is provided at a different position from a key input unit to display an instruction for a user to input a key pattern during face authentication;
allowing an image capturing unit to capture a face of a user and/or a movement of a portion of the face of the user during a portion of or the entire time from when the presentation pattern display unit displays the instruction to when the key input is completed; and
determining whether the captured face image is of a living body,
wherein the presentation pattern display unit displays an instruction to see the image capturing unit while the user alternately views the presentation pattern display unit and the key input unit.

7. The face authenticating method according to claim 6, wherein the presentation pattern display unit is separated from the key input unit in the vertical direction.

8. The face authenticating method according to claim 6, wherein the presentation pattern display unit displays a portion of the instruction, detects an input timing to the key input unit, and displays the other portion of the instruction after the input is confirmed.

9. The face authenticating method according to claim 6, wherein the presentation pattern display unit displays a keypad including random numbers arranged thereon to allow the user to input keys corresponding to the arrangement using the key input unit.

10. The face authenticating method according to claim 6, further comprising:
determining whether, after a rational time has elapsed after the presentation pattern display unit displays a predetermined instruction, a key input corresponding to the instruction is performed on the key input unit.

11. A non-transitory computer-readable medium storing a program for allowing a computer to implement the function according to claim 1.

12. A face authenticating apparatus according to claim 1, further comprising:
a determining unit to determine whether the captured face is a face of a living body, by comparing a plurality of frames of the captured face.

13. A face authenticating method according to claim 6, further comprising:
determining whether the captured face is a face of a living body, by comparing a plurality of frames of the captured face.

14. A face authenticating apparatus comprising:
a keypad;
a display device that is provided at a different position from the keypad, wherein the display device is adapted to display an instruction for a user to input a key pattern during face authentication;
a camera adapted to capture a face of a user and/or a movement of a portion of the face of the user during a portion of or the entire time from when the display device displays the instruction to when the key input is completed; and a processor adapted to determine whether the captured face image is of a living body, wherein the display device displays an instruction to see the camera while the user alternately views the display device and the keypad.

15. The face authenticating apparatus according to claim 14, wherein the display device is separated from the keypad in a vertical direction.

16. The face authenticating apparatus according to claim 14, wherein the display device displays a portion of the instruction, detects an input timing to the keypad, and displays another portion of the instruction after the input is confirmed.

17. The face authenticating apparatus according to claim 14, wherein the display device displays random numbers to allow the user to input keys corresponding to the arrangement using the keypad.

* * * * *